Sept. 30, 1947.　　　　L. W. LESSLER　　　　2,428,333
PHOTOGRAPHIC PRINTER
Filed Oct. 30, 1943　　　　3 Sheets-Sheet 1
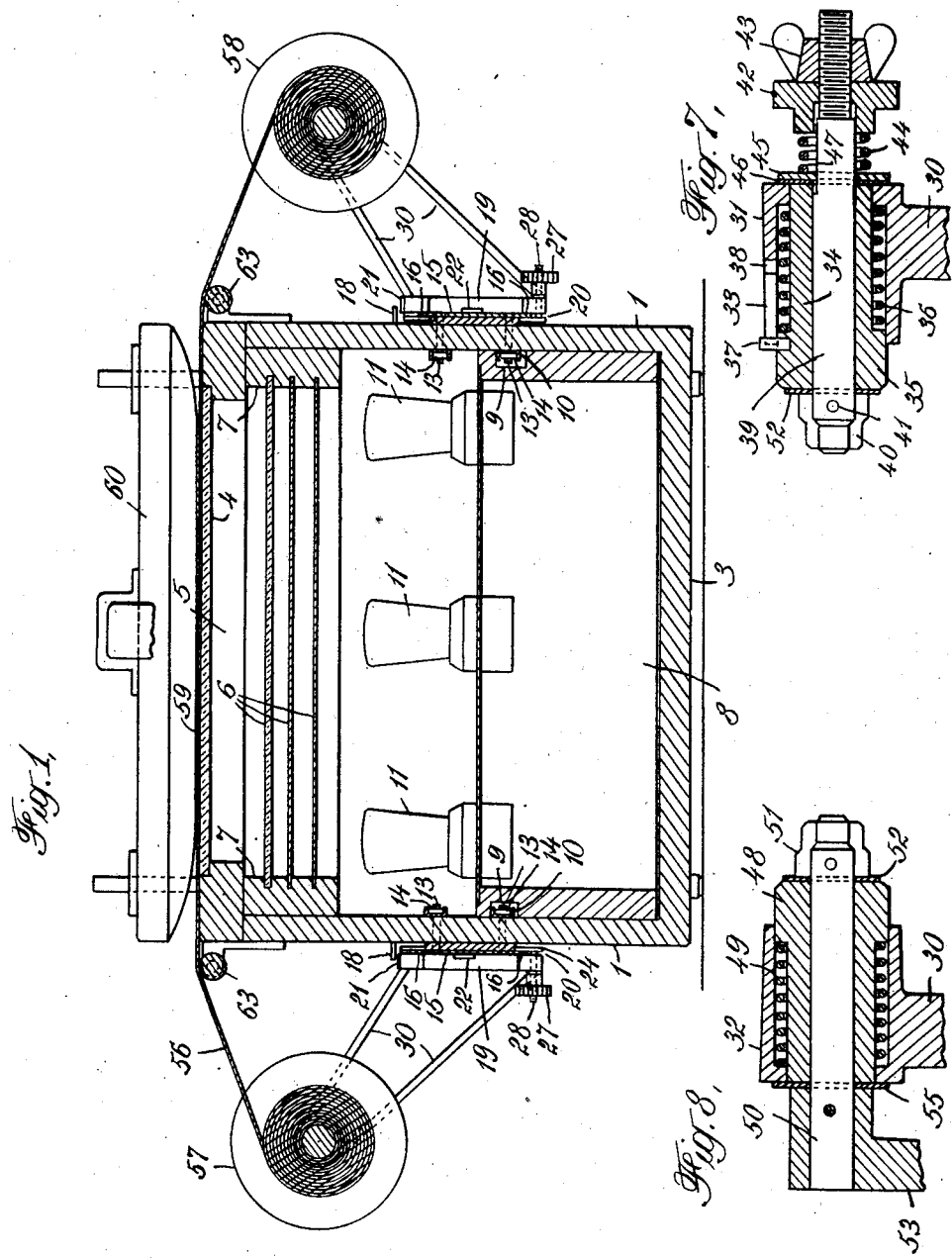
INVENTOR
Lew W. Lessler
BY Henry W. Coughlin
ATTORNEY Sept. 30, 1947.　　L. W. LESSLER　　2,428,333
PHOTOGRAPHIC PRINTER
Filed Oct. 30, 1943　　3 Sheets-Sheet 2
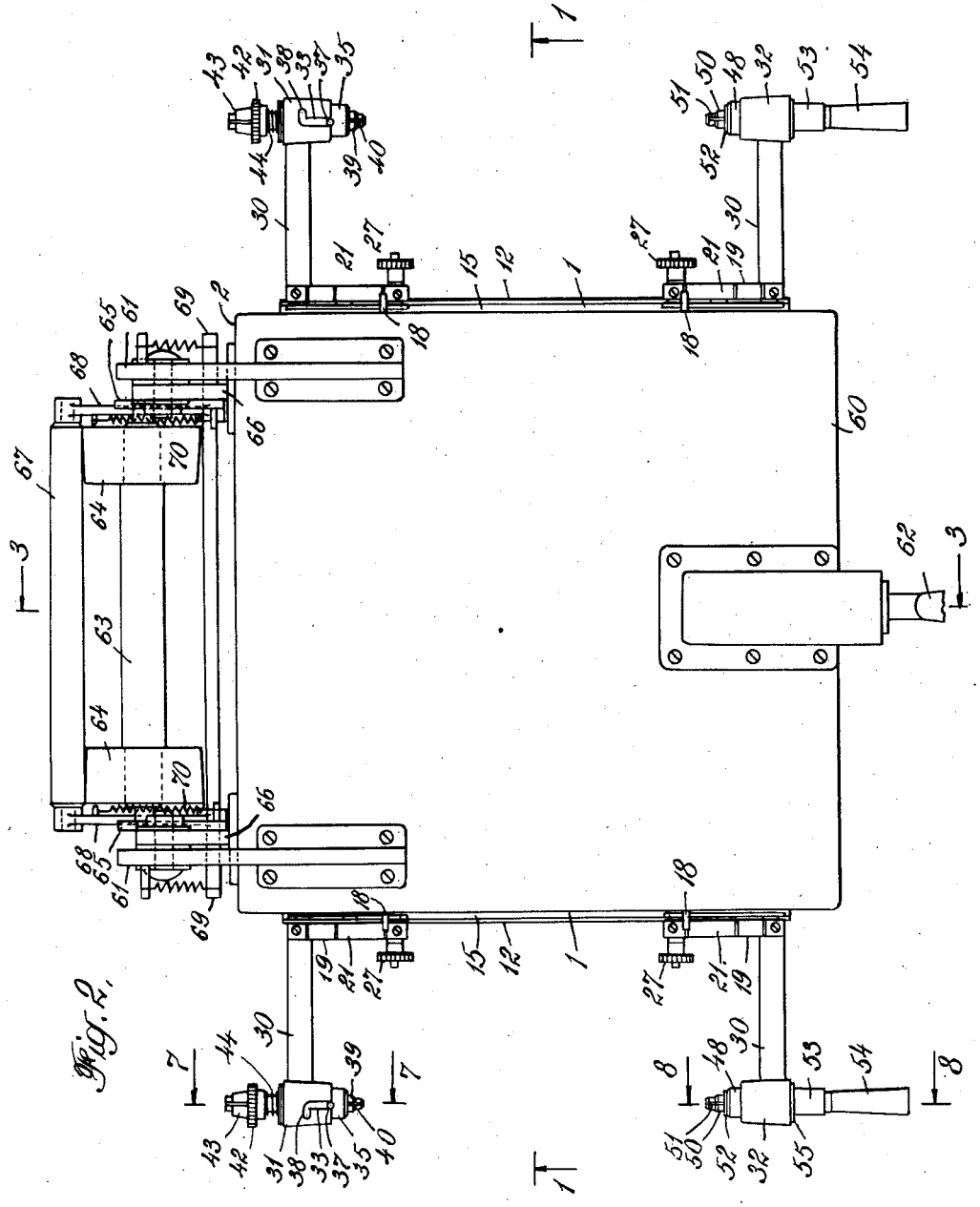
INVENTOR
Lew W. Lessler
BY Henry W. Coughlin
ATTORNEY Sept. 30, 1947.    L. W. LESSLER    2,428,333
PHOTOGRAPHIC PRINTER
Filed Oct. 30, 1943    3 Sheets-Sheet 3
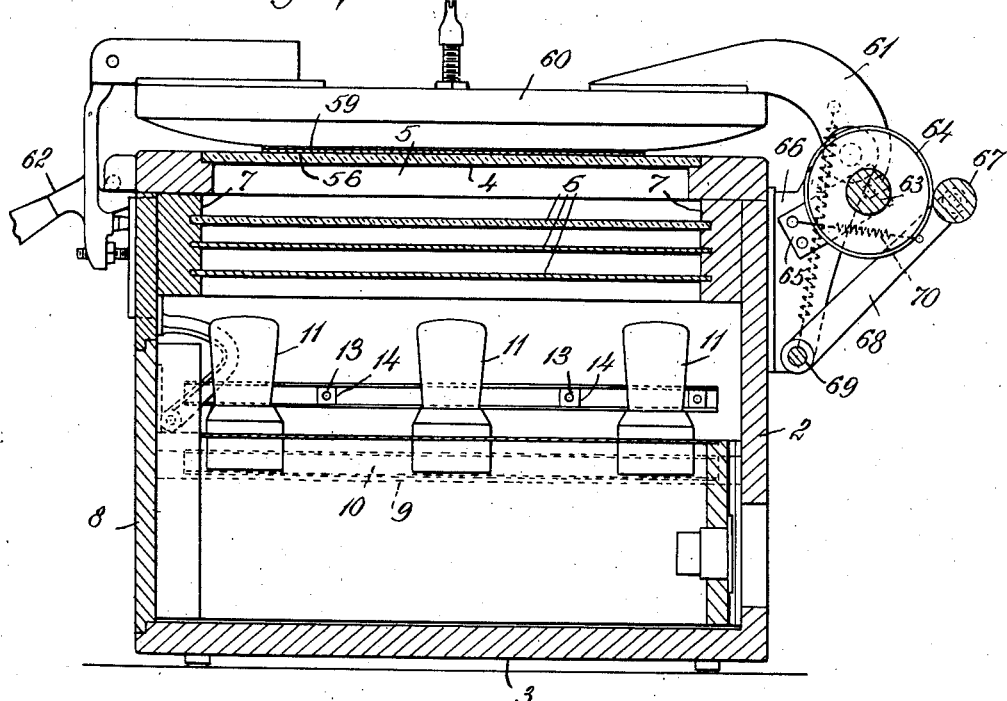
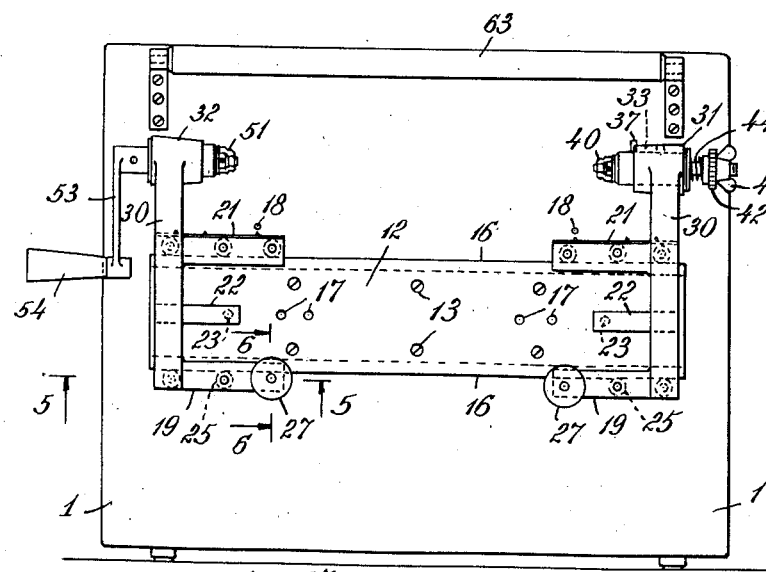
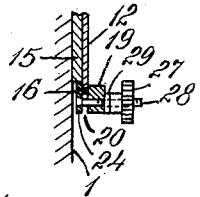
INVENTOR
Lew W. Lessler
BY Henry W. Coughlin
ATTORNEY Patented Sept. 30, 1947

2,428,333

UNITED STATES PATENT OFFICE 2,428,333

PHOTOGRAPHIC PRINTER

Lew W. Lessler, Binghamton, N. Y., assignor to General Aniline & Film Corporation, New York, N. Y., a corporation of Delaware Application October 30, 1943, Serial No. 508,275

6 Claims. (Cl. 95—75)

This invention relates to improvements in photographic printers provided with film spool-supporting and winding mechanisms in which the film can be wound on one spool while unwinding from the other and thus pass across the exposure opening to permit printing of the negatives in continuous and rapid succession.

One of the objects of the invention is to provide a printer with movably mounted spool-supporting means so as to permit use of film spools of varying lengths and diameters. A further object is to provide adjustable supporting means with indicating and indexing means so that the supporting means can be pre-set to carry any predetermined sizes of film spool.

Another object of the invention is to provide locking means for locking the spool-supporting means in any predetermined position. A still further object of the invention is to provide retractable spool shafts for ready loading of the film and to afford facilities for holding one of the spool shafts in retracted position. Another object of the invention is to provide adjustable friction means on one of the spool shafts to retard rotation of the spool, thereby preventing undesirable unrolling of the film at a speed greater than winding speed, and also permitting the film to be held taut during the printing operation.

These and other novel features of the invention will be apparent from the description of the device which follows. In the accompanying drawings which illustrate one of the embodiments of the invention:

Figure 1 is a longitudinal front view partly in section taken along line 1—1 of Figure 2.

Figure 2 is a top plan view of the printer.

Figure 3 is an end view partly in section taken along line 3—3 of Figure 2.

Figure 4 is an elevational end view of the printer.

Figure 5 is a detailed cross-sectional view taken along line 5—5 of Figure 4.

Figure 6 is a detailed cross-sectional view taken along line 6—6 of Figure 4.

Figure 7 is a detailed cross-sectional view taken along line 7—7 of Figure 2.

Figure 8 is a cross-sectional view taken along line 8—8 of Figure 2.

The printer may be of either the contact or projection type. In an illustrative form of construction, the printer comprises a casing having end members 1, a back member 2, a bottom member 3, and a supporting glass 4 mounted in the exposure opening 5. Translucent plates 6, slidable in grooves in blocks 7 aid in the diffusion of light during printing.

In the casing is a light unit 8 which slides drawer-like fashion in and out thereof so that the unit may be readily removed. The ends of the drawer are provided with grooves 9 into which project channel-shaped tracks 10 mounted in the ends 1 of the casing. Tracks 10 serve as guides for the slidable lighting unit and also as a reinforcement as will be explained hereinbelow. Printing light means such as light bulbs 11 are mounted in the lighting unit 8.

Mounted on each of the end members is a guiding means, such as track 12. This track is secured to the end member by suitable means such as bolts 13 and nuts 14. The bolts pass through the end member 1 and the tracks 10 upon which the lighting unit slides and are secured by the nuts 14 which are prevented from becoming loose by the shape of the tracks. The tracks 10, it will be seen, serve as reinforcing ribs for the end wall 1 in its support of the track 12.

Track 12 is spaced from the end members 1 by a plate 15 so as to form ribs 16 thereon. Track 12 is also provided with index openings 17 (Fig. 4), the function of which will be explained presently. In the end walls 1 and adjacent the track 12 are mounted indicating pins 18, the purpose of which will be explained hereinbelow.

Movably mounted on the track 12 are spool-supporting means or brackets 19. The brackets are provided with channels 20 which cooperate with the ribs 16 of track 12 to form a slidable connection therewith. On top of the brackets is a scale indicating means such as a plate 21 carrying indicia corresponding to various film spool lengths. These scales cooperate with the pins 18 to enable pre-setting of the brackets to support any length of spool.

Mounted on each of the slidable brackets 19 are extensions 22 of a spring-like nature which are provided at their ends with engaging means, such as indexing pins 23. Indexing pins 23 snap into the above-mentioned index openings 17 when the brackets are set to support any predetermined length of spool.

The channels 20 in the brackets 19 may be unitary therewith or may be formed by a strip 24 which is separated by means of washers 25 from the main body of the bracket and which is secured thereto by suitable fastening means such as screws 26. Brackets 19 are each provided with a knurled nut 27 on threaded bolt 28. Tightening nut 27 serves to draw the strip 24 against the ribs 16, thus locking the brackets in any pre-set position. A washer 29 may be placed between the nut 27 and the bracket 19.

Extending from each bracket are extensions or arms 30 having bearings 31 and 32. The bearing 31 is provided with a bayonet slot 33. Mounted for sliding movement in the bearing 31 is a bushing 34 having an enlarged portion 35 which normally extends from the bearing. A spring 36 in the bearing surrounds the bushing and tends to force it to extended position. The enlarged portion 35 of the bushing carries a pin 37 which extends into the bayonet slot 33 and serves to prevent rotation of the bushing. When the bushing is retracted, the pin cooperates with the continued portion 38 of the slot 33 to lock the bushing 34 in retracted position.

Mounted in the bushing 34 is a spool shaft 39, the spool-supporting end thereof being provided with a web 40 attached thereto by means of a suitable pin 41. The web forms with the shaft a key which engages the conventional notch in the adjacent end of the film spool or roll. The other end of the shaft is threaded and is provided with a knurled nut 42 and a wing nut 43. Surrounding the shaft and bearing against the nut 42 is a spring 44. The spring presses against a washer 45 which in turn presses against a friction washer 46 adjacent the edge of the bushing. The shaft has a flat portion 47 and the opening of washer 45 is shaped to conform therewith so that it rotates with the shaft.

By turning the nut 42 on the shaft, the pressure of the spring 44 against the washers 45 and 46 can be adjusted, thus increasing or decreasing the friction of the washer 46 against the edge of bushing 34 and thus permitting adjustable retardation of the rotation of the shaft. Wing nut 43 permits locking of nut 42 in any set position.

Bearing 32 is provided with a bushing 48 similar to that mounted in bearing 31. Bushing 48 is mounted for sliding movement in the bearing and a spring 49 is mounted in the bearing and operates normally to keep the bushing in extended position. Rotatably mounted in the bushing is a spool shaft 50 provided at one end with a web 51 which engages the usual notch in the adjacent end of the film spool. A washer 52 may be placed on both the shafts 39 and 50 between the webs 40 and 51 and the edges of the bushings. Fastened to the other end of the shaft 50 is a crank 53 provided with a suitable handle 54 by which the shaft may be rotated. A washer 55 may be placed between the crank and the bearing.

During printing, the film 56 (Fig. 1) from film spools 57 and 58, and the sensitive printing paper 59 are held against glass 4 by platen 60 which is hinged by appropriate hinging means 61 to the back member 2 of the casing. A handle 62 is pivotally connected to the platen 60, and provides means for raising and lowering the platen and to lock it against the glass 4.

Idler rollers 63 serve as guiding means for the film 56 between spools 57 and 58.

A spool (Fig. 2) which comprises a spindle portion 63a, and two rollers 64 is rotatably mounted in brackets 65 attached to the hinge 61 supporting members 66 which are secured to the back member 2. A follow-up roller 67 mounted for rotation in brackets 68 which are movable about shaft 69, is urged by a spring 70 toward rollers 64.

The rollers 64 may support a roll of some transparent sheet material such as Cellophane, strips of which may be removed from the rollers and inserted between the sensitive printing paper 59 and film negative 56, particularly when working with a wet negative.

Operation

In practice, the printer is operated by loosening nuts 27 so as to permit the brackets 19 to be moved and pre-set depending on the size of the film spool to be used in the printer. The size having been predetermined, the brackets are adjusted until the indicating pins 18 point to corresponding size number on the scales 21. The spring pressed fingers 23 then automatically snap into the index openings 17. The nuts 27 are then tightened in order to lock the spool supporting brackets 19 in place. The operator then retracts the spool shaft 39 in bearing 31 and then turns it so that the pin 37 locks into the bayonet joint 33. The spool 57 is then mounted so that the web 51 slips into the adjacent notch of the spool. The spool shaft 39 is then released from its retracted position so that the web keys into the slot in the opposite end of the spool 57. By turning the nut 42, the operator may then adjust the pressure of friction washer 46 against the bushing 34 so as to retard the rotation of the spool to any desired extent. Spool 58 is mounted on the spool supporting means on the opposite end member of the printer in the identical manner as spool 57.

By turning the crank handles 53 on the opposite sides of the printer, the film may be wound up or unwound on either spool. The construction thus permits rapid selection of the desired negative image on film 56 and its speedy positioning over printing exposure plate 4. After the desired negative is selected, the light sensitive paper 59 is placed over the film and the platen 60 is clamped thereover. Light from the lighting unit 8 which has previously been adjusted for the proper intensity is projected through the glass 4, through the negative and onto the sensitive paper 59. The exposed paper is then removed and the printing operation may be repeated.

It will be seen from the above that applicant has provided a printer which facilitates rapid loading or printing of the film, which avoids accidental unwinding of the film and by means of the novel friction means prevents bending of spool flanges, and overcomes difficulties inherent in using spools having flanges of varying sizes. It will also be seen that applicant has provided a simple adjustable spool supporting means which permits use of varying lengths of film spools with the printer.

From the above description taken in connection with the accompanying drawings, the advantages of the construction and of the method of operation will be readily apparent to those skilled in the art to which the invention appertains, and while the principle of operation of the invention has been described together with the apparatus which is now considered to be the best embodiment thereof, it is to be understood that the device shown is merely illustrative and that such changes may be made when desired as are within the scope of the claims.

I claim:

1. A photographic printer comprising a casing having end members, a slidable lighting unit insertable in said casing, guide means on which said lighting unit is slidable and supported, said guide means being mounted on the inner side of each of the end members, a track on each of the outer sides of the end members, said track and said guide means being secured to the end members by single securing means extending through the track, the end members and into the guide means, a fastening means on the end of the securing means and prevented from unfastening by the guide means, a spool supporting means for each end of the spool movably mounted on said track, said means being adjustable on said track to accommodate spools of varying length, and including spool-engaging shafts having adjustable friction means to retard rotation of such shafts.

2. A photographic printer comprising a casing having end members, a slidable lighting unit insertable in said casing, guide means on which said lighting unit is slidable and supported, said guide means being mounted on the inner side of each of the end members, a track on each of the outer sides of the end members, said track and said guide means being secured to the end members by single securing means extending through the track, the end members and into the guide means, a fastening means on the end of the securing means and prevented from unfastening by the guide means, a spool-supporting means for each end of the spool movably mounted on said track, said means being adjustable on said track to accommodate spools of varying length, and including spool engaging shafts having adjustable friction means to retard rotation of such shafts, and a locking means for locking the said spool-supporting means in any predetermined position on said track.

3. A photographic printer comprising a casing having end members, a track on at least one of said end members, two spool-supporting brackets, one for each end of the spool movably mounted on said track, a bearing on each of said brackets, a retractable spool-engaging shaft mounted in the bearing of one of said brackets, adjustable friction means on said shaft to retard rotation thereof, and a retractable spool-engaging shaft provided with a crank in the bearing of the other bracket.

4. A photographic printer comprising a casing having end members, a track on at least one of said end members, two spool-supporting brackets, one for each end of the spool adjustably mounted on said track, a bearing in one of said brackets, a bushing mounted in said bearing, a retractable spool-engaging shaft in said bushing, spring means extending said shaft to engage one end of the spool, a friction element engaging an edge of the bushing, and an adjustable pressure engaging means to force said friction element against said edge of said bushing, a pin on said bushing, said bearing being provided with a slot, said pin cooperating with said slot to prevent rotation of the bushing and to lock the shaft in retracted position, a second bearing in the other of said two brackets, a bushing therein, a retractable spool engaging shaft in said bushing, spring means extending said shaft to engage the other end of said spool, and a crank mounted on said shaft to rotate said spool.

5. A photographic printer comprising a casing having opposite end members, a track mounted on each end member, two spool supporting brackets, one for each end of the spool, adjustably mounted on said track, the supporting brackets on one track being adapted to support a paying-out spool, the supporting brackets on the other track being adapted to support a receiving spool, a bearing in each of said brackets, a slidable spool-engaging shaft mounted in the bearing of one of said brackets, said bearing being provided with a bayonet slot, adjustable friction means on said shaft to retard rotation of the shaft, a pin adapted to engage said bayonet slot to hold the shaft in retracted position, and a retractable spool-engaging shaft provided with a crank in the bearing of the other bracket.

6. A photographic printer comprising a casing having end members, a slidable lighting unit insertable in said casing, a channel-shaped guide on which said lighting unit is slidable and supported, said guide being mounted on the inner side of each of the end members, a track on each of the outer sides of the end members, said track and said guide being secured to the end members by single securing means extending through the track, the end members, and into the channels of the guide members, a fastening means on the end of the securing means extending into the channels of the guide members, said channels preventing unfastening of the fastening means, and spool-engaging means adjustably mounted on said track.

LEW W. LESSLER.

REFERENCES CITED

The following references are of record in the file of this patent:

UNITED STATES PATENTS

| Number | Name | Date |
|---|---|---|
| 909,534 | Bresnan | Jan. 12, 1909 |
| 1,651,441 | Caps | Dec. 6, 1927 |
| 1,186,653 | Folmer | June 13, 1916 |
| 880,345 | Williams | Feb. 25, 1908 |
| 2,255,811 | Richards | Sept. 16, 1941 |
| 1,000,247 | Ferguson | Aug. 8, 1911 |
| 1,812,199 | Crayssac | June 30, 1931 |
| 2,344,405 | Grover | Mar. 14, 1944 |
| 2,371,594 | Hineline | Mar. 13, 1945 |